United States Patent Office 3,003,886
Patented Oct. 10, 1961

3,003,886
PRODUCTION OF COLORED GLASSES
Leslie F. Pither, Maumee, Ohio, assignor to Kimble Glass Company, a corporation of Ohio
No Drawing. Filed May 7, 1959, Ser. No. 811,529
5 Claims. (Cl. 106—52)

This invention relates to colored glass and more particularly to a novel method and glass batch constituents for producing either opal or transparent colored glasses. More specifically the invention relates to the production of stable colored glasses, namely, opaque opal glasses varying in color from light ivory to dark brown and transparent soda-lime or soda-potash-lime glasses varying in color from yellow to dark amber, all of which are adaptable to melting and fining in continuous tank furnace operation.

The term "opal glass" or "opalescent glass," as used herein, denotes any glass which has a light diffusing medium or phase therein which renders the glass essentially light diffusing and thus translucent or opaque. Opol glasses of various types are well known in the glass making art and some of the opalizing agents utilized heretofore have been fluorides, sulphates, chlorides and phosphates. Fluoride opal glasses have been known to be particularly desirable for illuminating purposes in having wide latitude of opal density. Other common forms of opal glasses have consisted of fire opals and alabaster glasses for producing illuminating glassware as well as various forms of art ware.

Previously in the production of ivory colored opaque opal glasses such as for structural panels, bottles or jars, difficulty has been experienced in compounding glass batch constituents having ivory colors satisfactory to the trade. This has been particularly true in producing such opalescent glasses as special ivory or light yellow colorations and many attempts have been made to produce such glasses by combinations of uranium and selenium oxides which materials are very closely and not readily available for this purpose. Also in producing colored opaque glass for architectural structures, problems have arisen in the fading or change in color of such glasses on prolonged exposure to sunlight. This has been true where the colorants have consisted of uranium and manganese oxides, for example.

Heretofore, selenium ruby glasses suitable for tank furnace melting, and especially for the production of machine-made ware, have been prepared from glass batch constituents using reducing agents such as carbonaceous materials or silicon and selenium in combination with a coloring agent such as selenium sulphide. The production of such selenium ruby glasses has been disclosed in U.S. Patent No. 2,414,413, issued to Pavlish and Austin on January 14, 1947, and entitled "Selenium-Containing Glass." It is disclosed therein that the loss of selenium from glass batches during melting and fining operations can be minimized by the addition to the batch of silicon-containing materials. Silicon is utilized therein as a reducing agent to retain specifically the selenium added to the batch at an optimum level in producing selenium ruby glass. This patent describes that small additions either of metallic silicon or chemically combined silicon make possible the reduction of the selenium addition to about ⅓ or less of that normally required in the glass batch. It should be noted that this patent relates only to making selenium containing glasses and specifically selenium ruby. There is no teaching in the prior art of producing and controlling the coloration of light-diffusing ivory-colored opal glasses, for example, or transparent soda-lime glasses through a wide range of colors by the addition of small amounts of very economical materials such as described hereinafter.

Accordingly, it is an object of this invention to provide a novel method of coloring glass by utilizing in combination within a glass batch minor amounts of a readily reducible chemically combined material adapted to impart coloration to the glass and a readily oxidizable glass-forming elemental which alone does not impart coloration to the glass.

Another object of the invention is to provide an improved method of producing colored glasses ranging in color from light ivory to dark brown for opaque opal glasses and from light yellow to dark amber for transparent soda-lime or soda-potash-lime glasses by the use of readily available economical components employed in small amounts which do not deleteriously affect the characteristics of the colored glass product.

Another object of this invention is to provide an improved method of and glass batch for producing an opaque opal glass varying in color from light ivory to dark brown by incorporating into a fluoride opal glass batch a combined sulphur containing material and a glass-forming elemental metal such as silicon or aluminum in powder form which alone does not impart a coloration to the glass nor adversely alter its characteristics if employed in slight excess.

A further object of this invention is to provide an improved method of and glass batch for producing a colored transparent soda-lime glass varying in coloration from light yellow to dark amber, which glass has good chemical durability and pleasing coloration and has suitable working properties for melting, fining and forming in a conventional manner.

The specific nature of the invention, as well as other objects and advantages thereof, will become apparent to those skilled in the art from the following detailed description.

The present invention consists of producing a very economical chemically stable and durable opaque ivory-colored opal or pale transparent amber glass and variations thereof by employing in combination with the glass batch constituents chemically combined sulphur and a glass forming elemental metal as a reducing agent, which metal does not alone produce color or perceptibly change the properties of the glass. In accordance with the invention only small amounts of the prescribed components are necessary to effect the coloration and this may be achieved without deleterious alteration of properties of a given glass. The readily reducible color producing constituent included in the glass batch comprises combined sulphur, preferably in the form of salt cake, pyrites, or gypsum, or other commercially available sulphur-containing glass-forming material. For purposes of economy in the production of large amounts of the subject colored glasses, one of the aforementioned materials is preferably employed. The glass forming elemental metal which is employed as a reducing agent preferably consists of metallic silicon or metallic aluminum, neither of which exerts any coloring effects upon a melted glass. Other elemental metals such as calcium, magnesium, sodium, potassium, lithium, and barium can also be utilized as the reducing agent instead of silicon or aluminum metal but for ease of handling the latter two are preferred. Zinc metal can also be used for this purpose. Various forms of silicon can be used, however, metallurgical grade silicon in powder form is advantageous due to its ease of handling, low cost and ready availability. Powdered aluminum metal is also readily available and economical.

It has been found that only small percentages of the elemental metal and combined sulphur are required to produce the desired coloring effect. In Table I raw batch constituents and calculated batch compositions are listed for five different opal glasses along with C.I.E. colorimetric data obtained thereon.

Table I
OPAL GLASSES

| Batch Constituents | 1 | 2 | 3 | 4 | 5 |
|---|---|---|---|---|---|
| Powdered Flint | 2,300 | 2,300 | 2,300 | 2,300 | 2,153 |
| Soda Ash | 884 | 884 | 884 | 884 | 656 |
| Nepheline Syenite | 1,393 | 1,393 | 1,393 | 1,393 | 1,307 |
| Fluorspar | 401 | 401 | 401 | 401 | 441 |
| Sodium Silicofluoride | 145 | 145 | 145 | 145 | 164 |
| Borax (Dehydrated) | 56 | 56 | 56 | 56 | 51 |
| Zinc Oxide | 29 | 29 | 29 | 29 | 26 |
| Salt Cake | 1.1565 | 1.1565 | 1.1565 | 1.1565 | 14 |
| Silicon (Powdered metal) | 0.3766 | 0.7532 | | | 7.5 |
| Aluminum (Powdered metal) | | | | 0.4826 | |
| Iron Pyrites | | | | | 5.8 |
| Calculated Batch Composition: | | | | | |
| $SiO_2$ ----percent | 66.22 | 66.21 | 66.22 | 66.20 | 66.28 |
| $B_2O_3$ ----do | 0.80 | 0.80 | 0.80 | 0.80 | 0.79 |
| $Al_2O_3$ ----do | 6.74 | 6.74 | 6.74 | 6.74 | 6.70 |
| $Na_2O$ ----do | 14.79 | 14.79 | 14.80 | 14.81 | 12.77 |
| $K_2O$ ----do | 1.33 | 1.33 | 1.33 | 1.33 | 1.33 |
| CaO ----do | 6.14 | 6.14 | 6.14 | 6.14 | 7.24 |
| MgO ----do | 0.03 | 0.03 | 0.03 | 0.03 | 0.03 |
| $F_2$ ----do | 5.71 | 5.71 | 5.71 | 5.71 | 6.76 |
| $O_2$ ----do | −2.40 | −2.40 | −2.40 | −2.40 | −2.85 |
| ZnO ----do | 0.60 | 0.60 | 0.60 | 0.60 | 0.57 |
| $Fe_2O_3$ ----do | .03 | .03 | .03 | .03 | .087 |
| S ----do | 0.0043 | 0.0054 | 0.005 | 0.005 | .116 |
| Si ----do | 0.0057 | 0.0146 | | | .160 |
| Al ----do | | | | 0.010 | |
| Total ----do | 100.000 | 100.000 | 100.000 | 100.000 | 100.000 |
| C.I.E. Data (@ ⅛ in. thick specimen): | | | | | |
| Percent Brightness | 68.4 | 67.2 | 78.0 | 75.4 | 19.2 |
| Percent Purity | 4.5 | 12.0 | 4.9 | 0.8 | 36.0 |
| Dominant Wave Length | 565 | 574 | 483 | 512 | 578 |

The oxygen equivalent for fluorine, the ratio of 16/38, is subtracted from the total fluorine content to place the analysis on a full oxide basis.

In addition to the C.I.E. data indicated above, composition No. 1 may be described as a light ivory-colored opal while composition No. 2 may be described as a slightly deeper shade of ivory. Composition No. 3, to which no elemental metal was added, may be described as an off-white or bluish-white coloration having the appearance of an alabaster glass. Composition No. 4 may be described as a light ivory color while composition No. 5 containing a considerably greater amount of elemental silicon exhibited an olive-brown coloration. Various intermediate shades between light ivory and olive-brown coloration may be achieved by variations in amounts of the combined sulphur containing material and elemental metal. In the deeper shades iron is added to the batch to enhance the color while in the lighter shades iron is introduced as an impurity in the raw material.

In Table II set forth below, the raw batch constituents and calculated batch compositions of three transparent glass compositions are set forth along with C.I.E. colorimetric data defining their colors.

Table II
TRANSPARENT SODA-LIME GLASSES

| Batch Constituents | 6 | 7 | 8 |
|---|---|---|---|
| Sand | 2,000 | 2,000 | 2,000 |
| Soda Ash | 700 | 700 | 700 |
| High Calcium Lime | 611 | 611 | 611 |
| Feldspar | 257 | 257 | 257 |
| Gypsum | 14 | 14 | 14 |
| Iron Pyrites | 5.80 | | |
| Red Iron Oxide | | 4.438 | 5.829 |
| Silicon Powder | 7.5 | 7.5 | 8.5 |
| Calculated Batch Composition: | | | |
| $SiO_2$ ----percent | 71.64 | 71.72 | 71.67 |
| $B_2O_3$ ----do | 1.88 | 1.88 | 1.88 |
| $Na_2O$ ----do | 14.02 | 14.03 | 14.02 |
| $K_2O$ ----do | 0.38 | 0.38 | 0.38 |
| CaO ----do | 11.42 | 11.43 | 11.42 |
| MgO ----do | 0.11 | 0.11 | 0.11 |
| $Fe_2O_3$ ----do | .125 | 0.121 | 0.158 |
| S ----do | .183 | 0.083 | 0.082 |
| Si ----do | .242 | 0.246 | 0.280 |
| | 100.000 | 100.000 | 100.000 |
| C.I.E. Data (@ ⅛ inch thick specimen): | | | |
| Percent Brightness | 52.0 | 77.7 | 63.9 |
| Percent Purity | 74.0 | 19.7 | 51.1 |
| Dominant Wave Length | 578 | 572 | 575 |

Glass designated as compositions Nos. 6–8 are transparent and each exhibits a distinctive coloration ranging from light yellow to dark amber. The constituents of these glasses may be modified considerably within prescribed limits for conventional soda-lime glasses to produce commercial glasses having desired working properties including necessary viscosities and liquidus temperatures for fabricating glassware.

Composition No. 6 may be termed a dark amber comparable to amber beer bottle glass. Composition No. 7 is a light-yellow greenish amber while composition No. 8 may be described as a medium amber. All of the above transparent glasses were colored by minor additions of combined sulphur and silicon metal added to the batch constituents. These glasses also contained a small amount of added iron.

It has been found that fluoride opal glasses may be colored from opaque light ivory to opaque dark brown by incorporating into the glass batch from 0.065 to 2.55 parts by weight sulphur per 1000 parts of silica, the sulphur being present in chemically combined form, with an addition of elemental metal ranging in amount from 0.086 to 3.91 parts by weight metal per 1000 parts of silica. This range of metal has been found to be satisfactory for coloring with silicon metal, as indicated in the above tables, however in coloring with aluminum metal it has found that approximately twice as much metal is needed to develop the same colors. The amount of elemental metal may be present in an amount of up to about 8 parts by weight metal per 1000 parts by weight of silica. The metal serves as the reducing agent to reduce at least a portion of the sulphur to metallic sulfides such as iron sulfide, for example, to develop the coloration. The opal glass batch may consist of the following constituents in calculated percentage by weight:

Ranges of opal glass constituents:

| | |
|---|---|
| $SiO_2$ | 60–75 |
| $B_2O_3$ | 0–2 |
| $Al_2O_3$ | 4–9 |
| $Na_2O$ | 10–18 |
| $K_2O$ | 0–10 |
| CaO | 0–11 |
| MgO | 0–2 |
| $F_2$ | 4–8 |
| ZnO | 0–2 |

| | |
|---|---|
| $Fe_2O_3$ | 0–0.10 |
| Sulphur | 0.0043–0.183 |
| Elemental metal | 0.0057–0.280 |

Glass batches which have been found to be suitable for producing colored transparent soda-lime glasses ranging in color from yellow to dark amber have consisted of the following constituents in calculated precentage by weight:

Range of transparent soda-lime glass constituents:

| | |
|---|---|
| $SiO_2$ | 66–72 |
| $B_2O_3$ | 0–1 |
| $Al_2O_3$ | 0–4 |
| CaO | 7–11 |
| MgO | 0–6 |
| $Na_2O$ | 12–17 |
| $K_2O$ | 0–3 |
| BaO | 0–1 |
| $Fe_2O_3$ | 0–0.16 |
| Sulphur | 0.0043–0.183 |
| Elemental metal | 0.0057–0.280 |

The present invention has been utilized commercially to a widespread degree in the production of glass containers and specifically in the production of ivory opal bottles and jars for retaining lotions and deodorants. The glasses can be readily melted and formed with conventional glass melting, fining and forming equipment with satisfactory uniform colors free from streaks and blemishes. Such conventional melting, fining and forming conditions are well known in the art and are particularly set forth in Tooley's "Handbook of Glass Manufacture," Ogden Publishing Company, New York 36, New York, 1953 edition, at page 245 in Tables IXB–I and IXB–II, and as further explained in pages 242–252. The method has been employed in the production of the well-known "Old Spice" lotion bottle sold and distributed by the Shulton Company to contain shaving lotions and deodorants to simulate pottery ware.

The C.I.E. colorimetric values are based upon the C.I.E. chromaticity diagram. C.I.E. refers to the International Commission of Illumination and the diagram defines color in terms of mixtures of theoretical clored lights. The C.I.E. system makes possible the exact specification of colors by means of a "color map." The C.I.E. system of color notation specifies the color of glasses in terms of brightness, purity and dominant wave length. "Brightness," which is usually expressed in terms of percentage, is the amount of visual response to a normal observer to the radiation emergent from a transparent object relative to the response in this observer to the radiation incident upon the object. Thus, brightness may be briefly termed the lightness of color of an object. "Purity," which is also normaly expressed in terms of percentage, is a measure of the monochromaticness of a color with monochromatic light having a purity of 100%. By diluting the monochromatic radiation with white light made up with all wave lengths, we thereby dilute the color and reduce purity. "Dominant wave length," usually expressed in milli-microns (m$\mu$), is the wave length of monochromatic light appearing to the eye to have the same "hue" as the mixed light actually encountered.

Various modifications may be resorted to within the spirit and scope of the appended claims.

I claim:

1. The method of producing colored opal glass ranging in coloration from opaque light ivory to opaque dark brown comprising the steps of providing an opal glass batch consisting essentially of the following constituents in calculated percentage by weight: 60–75% $SiO_2$, 0–2% $B_2O_3$, 4–9% $Al_2O_3$, 10–18% $Na_2O$, 0–10% $K_2O$, 0–11% CaO, 0–2% MgO, 4–8% $F_2$, 0–2% ZnO, 0–0.10% $Fe_2O_3$, 0.0043–0.183% sulphur, and 0.0057–0.280% glass-forming elemental metal in powder form selected from the group consisting of silicon, aluminum, zinc, barium, calcium, magnesium, sodium, potassium and lithium, said sulfur being included in said batch in readily reducible form, melting the said batch constituents, by heat-reaction in a melting chamber, effecting a reduction of at least a portion of said sulfur to metallic sulfides within said melting chamber to effect coloration of the molten glass, said elemental metal becoming oxidized and producing no coloration, and conveying the said molten glass to a point of use.

2. The method of producing colored opal glass ranging in coloration from opaque light ivory to opaque dark brown comprising the steps of providing an opal glass batch consisting essentially of the following constituents in calculated percentage by weight: 60–75% $SiO_2$, 0–2% $B_2O_3$, 4–9% $Al_2O_3$, 10–18% $Na_2O$, 0–10% $K_2O$, 0–11% CaO, 0–2% MgO, 4–8% $F_2$, 0–2% ZnO, 0–0.10% $Fe_2O_3$, 0.0043–0.183% sulphur, and 0.0057–0.280% glass-forming elemental metal in powder form selected from the group consisting of silicon and aluminum, said sulfur being included in said batch in readily reducible form, melting the said batch constituents by heat-reaction in a melting chamber, effecting a reduction of at least a portion of said sulfur to metallic sulfides "in situ" within said melting chamber to effect uniform coloration of the molten glass, said elemental metal becoming oxidized and producing no coloration, and conveying the said molten glass to a point of use.

3. A glass batch for producing colored opal glass ranging in coloration from opaque light ivory to opaque dark brown consisting essentially of the following constituents in calculated percentage by weight: 60–75% $SiO_2$, 0–2% $B_2O_3$, 4–9% $Al_2O_3$, 10–18% $Na_2O$, 0–10% $K_2O$, 0–11% CaO, 0–2% MgO, 4–8% $F_2$, 0–2% ZnO, 0–0.10% $Fe_2O_3$, 0.0043–0.183% sulphur, and 0.0057–0.280% glass-forming elemental metal in powder form which metal alone does not impart coloration to the glass, said metal being selected from the group consisting of silicon, aluminum, zinc, barium, calcium, magnesium, sodium, potassium, and lithium.

4. A glass batch in accordance with claim 3, wherein said elemental metal comprises silicon.

5. A glass batch in accordance with claim 3, wherein said elemental metal comprises aluminum.

References Cited in the file of this patent

UNITED STATES PATENTS

| | | |
|---|---|---|
| 1,864,858 | Rising | June 28, 1932 |
| 1,899,230 | Crowell | Feb. 28, 1933 |
| 2,113,195 | Flint | Apr. 5, 1938 |
| 2,282,601 | Blau et al. | May 12, 1942 |
| 2,414,413 | Pavlish et al. | Jan. 14, 1947 |
| 2,503,140 | Stookey | Apr. 4, 1950 |
| 2,921,860 | Stookey | Jan. 19, 1960 |